United States Patent [19]
Burkhardt

[11] Patent Number: 4,616,131
[45] Date of Patent: Oct. 7, 1986

[54] INCREMENTAL LENGTH OR ANGLE MEASURING SYSTEM

[75] Inventor: Horst Burkhardt, Truchtlaching, Fed. Rep. of Germany

[73] Assignee: Dr. Johannes Heidenhain GmbH, Traunreut, Fed. Rep. of Germany

[21] Appl. No.: 591,467

[22] Filed: Mar. 20, 1984

[30] Foreign Application Priority Data

Mar. 26, 1983 [DE] Fed. Rep. of Germany ....... 3311204

[51] Int. Cl.⁴ ............................................... G01D 5/34
[52] U.S. Cl. .......................... 250/231 SE; 250/237 G
[58] Field of Search ..................... 250/231 SE, 237 G; 340/347 P, 870.29; 356/395; 33/169 R

[56] References Cited

U.S. PATENT DOCUMENTS

| | | | |
|---|---|---|---|
| 3,139,613 | 6/1964 | DeNegri | 340/347 P |
| 3,187,187 | 6/1965 | Wingate | 250/231 SE |
| 3,702,471 | 11/1972 | Kennedy et al. | 340/347 P |
| 4,403,859 | 9/1983 | Ernst | 250/237 G |
| 4,466,189 | 8/1984 | Tobin, Jr. | 250/231 SE |
| 4,491,928 | 1/1985 | Reichl | 250/237 G |

*Primary Examiner*—David C. Nelms
*Assistant Examiner*—Michael Messinger
*Attorney, Agent, or Firm*—Willian Brinks Olds Hofer Gilson & Lione Ltd.

[57] ABSTRACT

An incremental measuring system is disclosed in which a reference position can be determined at any time. A rotating carrier body carries an additional incremental graduation for which scanning fields are arranged on a scanning plate. During a calibrating operation an additional marking on the rotating carrier body is used to determine coincidence with an associated scanning field. At this point a measuring value counter is started which counts graduation increments associated with rotation of the carrier body by means of associated scanning fields until the measuring value counter is stopped. This stopping of the counter is controlled by a signal generated on coincidence of an additional marking of the carrier body with the next reference mark on the graduated disc which carries the measuring graduation. Simultaneously, an additional marking of the carrier body reads a code mark associated with the reference mark. Each of the code marks contains in coded form the absolute position of the associated reference mark with respect to the zero point of the measuring graduation. The reference position is determined from the counting value of the increments which are superposed on the absolute position value of the overrun reference mark.

13 Claims, 4 Drawing Figures

INCREMENTAL LENGTH OR ANGLE MEASURING SYSTEM

BACKGROUND OF THE INVENTION

The present invention relates to an incremental length or angle measuring system of the type which includes a measuring scale which defines an incremental graduation and at least one reference mark, a scanning unit which comprises a plurality of scanning fields for scanning the measuring scale, and an evaluating system for evaluating scanning signals generated by the scanning unit.

Length and angle measuring systems are known to the art, as well as methods for determining reference positions in such measuring systems. In one prior art approach, for example, machine or measuring system components which are movable relative to one another are driven from a starting position to a reference mark in order to determine and store the distance between the starting position and the reference mark, or to utilize the reference position defined by the reference mark as a zero point. Such a method can be used in an incremental length or angle measuring system such as described in German Pat. DE-PS No. 19 64 381. This method requires, however, unimpeded relative movability of the objects to be measured, since the components of the measuring system are firmly joined with the objects to be measured and must therefore be shifted in unison with the components of the measuring system up to the reference mark.

German DE-OS No. 16 73 887 discloses another prior art measuring system for a machine, which allows a reference position to be determined even when the slide piece of the machine is clamped fast with respect to the machine bed. In this system, the slide piece must first be driven into the position that is later to be used as the zero reference position. After this has been done, the slide piece is clamped fast to the machine bed. Then the scanning plate is moved relative to the scale until a reference mark is detected. Upon detection of the reference mark, the electronic counter of the measuring system is set to zero. The clamping of the slide to the bed of the machine can then be released and the slide piece driven to its desired position. The position of the reference mark, therefore, defines the reference position for further operations.

The prior art methods described above for determining a reference position as a starting position (prior to the initiation of working operations proper) are often not suitable for use with incremental measuring systems once working operations have commenced. For example, when working operations in progress are interrupted, it may not be possible to move machine components coupled to a measuring system to a desired position. For example, an automatic handler such as an industrial robot may be interrupted during its operation through a power failure. The robot then remains standing in its momentary position. The measuring value, determined as discussed above with reference to its original reference position, is lost through the power failure since the measurement was interrupted.

In order to continue the interrupted working operation, however, the reference position must be redetermined. A return movement of the robot from its momentary position into the original starting position is, however, as a rule not possible. For example, a tool positioned by the robot may be in engagement with the workpiece, thereby preventing relative movement between the tool and the workpiece.

SUMMARY OF THE INVENTION

The present invention is directed to an improved system for providing absolute position information to an incremental measuring system, which system obviates the disadvantages described above. The present invention makes it possible after a loss of position information in an arbitrary momentary position to reproduce a reference position without relative movement of the objects to be measured.

According to this invention, an incremental measuring system of the general type described initially above is provided with a carrier body which defines a plurality of scannable markings. Means are provided for mounting the carrier body for movement relative both to the measuring scale and the scanning unit such that the plurality of scannable markings can be brought into alignment with at least a portion of the plurality of markings on the measuring scale and scanning fields of the scanning unit. The scanning unit, measuring scale and carrier body cooperate to control the operation of the evaluating system upon alignment of selected ones of the markings on the carrier body and selected ones of the scanning fields and markings on the measuring scale. Further advantageous features of this invention are set forth in the dependent claims.

The invention itself, together with further objects and attendant advantages, will best be understood by reference to the following detailed description, taken in conjunction with the accompanying drawings.

DETAILED DESCRIPTION OF THE PRESENTLY PREFERRED EMBODIMENTS

Figure 1:
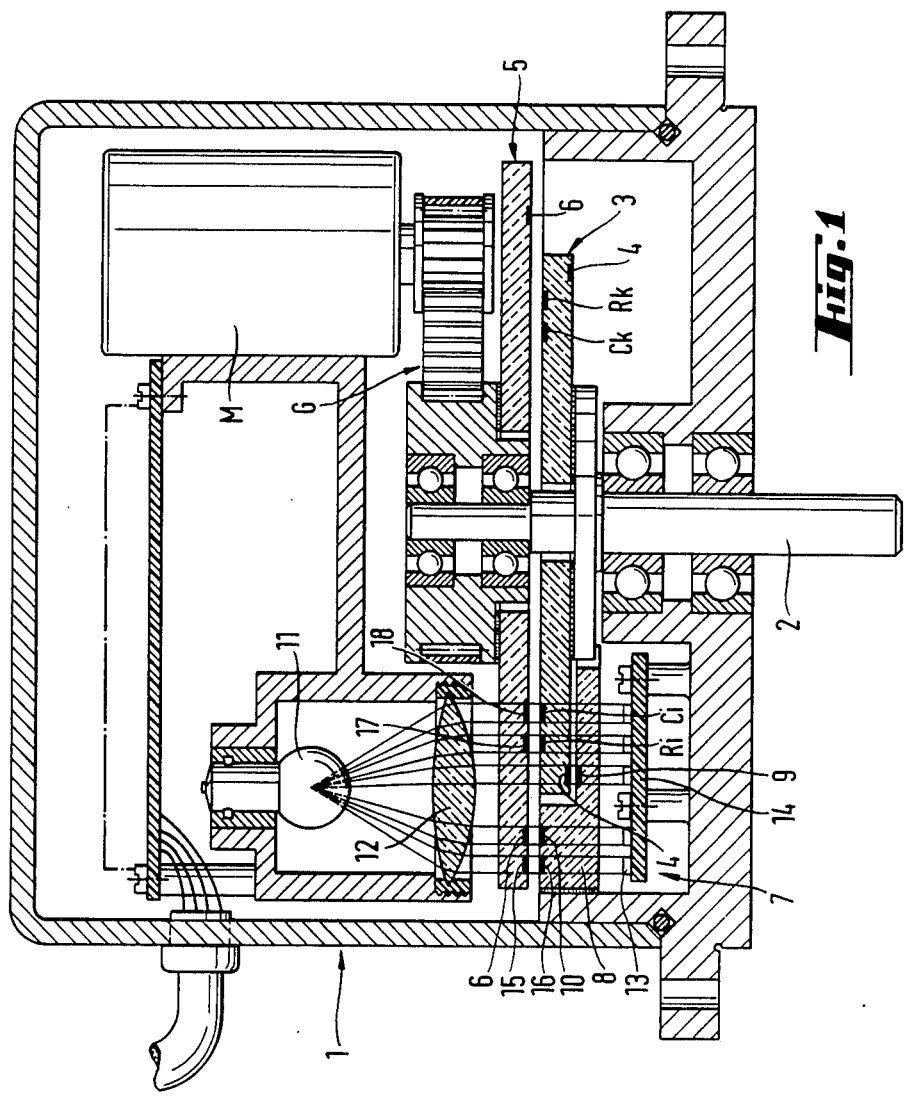
FIG. 1 is a cross-sectional representation of an incremental angle measuring system which incorporates a presently preferred embodiment of this invention.

Turning now to the drawings, FIG. 1 represents an angle measuring system which includes a housing 1 which is secured in place to a casing of an industrial robot (not shown). A shaft 2 is rotatably mounted in the housing 1 and extends into the interior of the housing 1. A disc 3 is mounted to rotate with the shaft 2, and the disc 3 defines an incremental graduation 4 in the form of a grid. The incremental graduation 4 is photoelectrically scanned.

A second disc or carrier body 5 is rotatably mounted on the shaft 2. The disc 5 defines an incremental graduation 6 which extends concentrically around the disc 5. Additional markings on the discs 3 and 5 are explained below in conjunction with FIGS. 2-4. A scanning unit 7 is included in the housing 1, and the scanning unit 7 includes a scanning plate 8, which defines markings in the form of scanning fields 9 and 10. The scanning unit 7 also includes a lamp 11, a condensor lens 12, and photosensors 13 which are arranged on a plate 14. Upon rotation of the shaft 2 with respect to the housing 1, the disc 3 turns with the shaft 2 and the incremental graduation 4 moves over the scanning fields 9. The scanning fields 9 aligned with the incremental graduation 4 define a grid graduation corresponding to the incremental graduation 4. Light originating at the lamp 11 is modulated by the grids as they move relative to one another, and the modulated light falls on the photosensors 13. These photosensors 13 generate scanning signals in response to incident light and these scanning signals are applied to a known evaluating system (not shown). The evaluating arrangement operates to form pulses from the scanning signals generated by the photosensors 13. These impulses are counted, and the count of these pulses is displayed in a counter in digital form as the measured position value.

Figure 2:
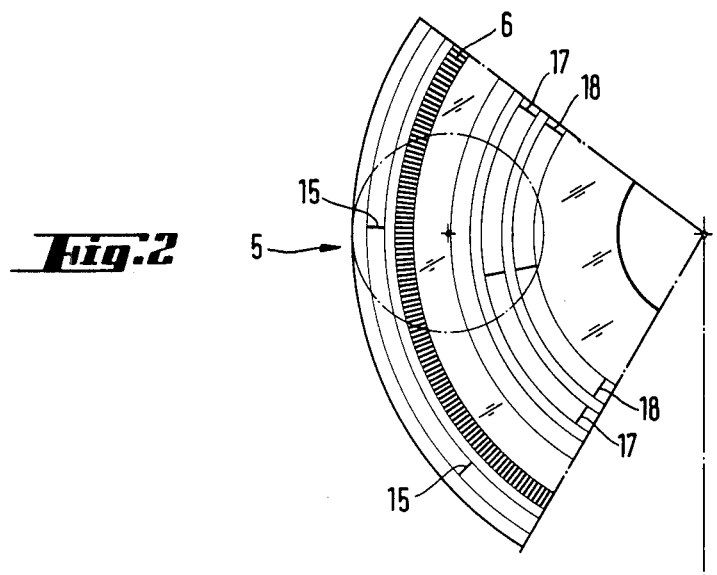
FIG. 2 is a fragmentary plan view of a carrier body included in the embodiment of FIG. 1.
Figure 3:
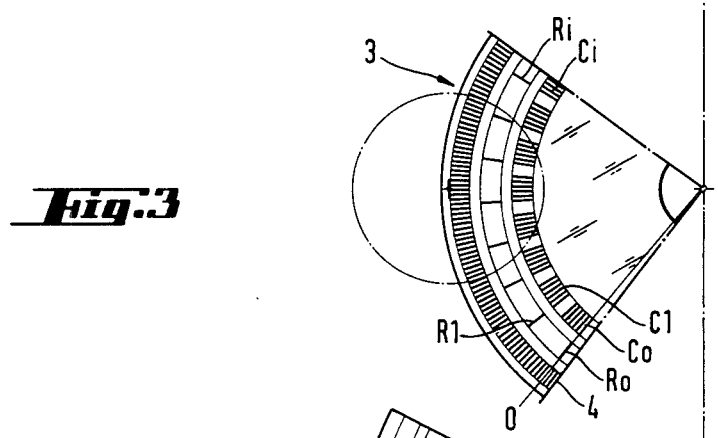
FIG. 3 is a fragmentary plan view of a measuring scale included in the embodiment of FIG. 1.
Figure 4:
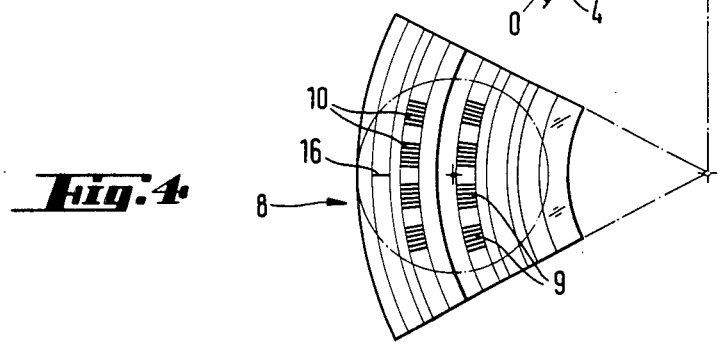
FIG. 4 is a plan view of a scanning plate included in the embodiment of FIG. 1.

FIGS. 2-4 present a fragmentary view of the carrier body 5, a fragmentary view of the measuring scale 3, and a plan view of the scanning plate 8, respectively. As apparent from these figures, each of these components defines a different set of markings.

The carrier body 5 represented in FIG. 2 defines several marking tracks, one of which is provided with an incremental graduation 6. In an outer track there are arranged markings 15 which are arranged to come into alignment with a marking 16 on the scanning plate 8 (FIG. 4). As explained below, the markings 15,16 are used for control purposes during the recovery or reproducing of a reference position. Further markings 17 on the carrier body 5 serve for the scanning of reference marks $R_o \ldots R_n$ which are defined by the measuring scale 3. Each of the reference marks $R_o \ldots R_n$ is positioned at a respective absolute position with respect to the zero point of the incremental graduation 4. The absolute position of each of the reference marks $R_o \ldots R_n$ is marked by respective code marks $C_o \ldots C_n$. Each of the code marks $C_o \ldots C_n$ encodes the absolute position of the associated one of the reference marks $R_o \ldots R_n$ as coded information, for example by means of a bar code. The code marks $C_o \ldots C_n$ are read with the aid of markings 18 which are defined on an inner track of the carrier body 5.

The graduated disc of the measuring scale 3 is fastened to the shaft 2 and mounted to turn with the shaft 2 within the casing 1. The scanning plate 8 is arranged as a component of the scanning unit 7 and is fixed in position in the housing 1. The carrier body 5 is rotatably mounted on the shaft 2 so as to be concentric with the measuring scale 3. The carrier body 5 is rotatable relative to the measuring scale 3. A motor M is included in the housing 1 and is linked to the carrier body 5 by means of a toothed belt drive linkage G. The motor M can be used to set the carrier body 5 in steady rotation, and the carrier body 5 is rotatable independently of the rotation of the shaft 2 and the graduated disc 3.

When the carrier body 5 is rotated, the incremental graduation 6 of the carrier body 5 is moved over the scanning field 10, and light emitted by the lamp 11 is modulated by the incremental graduation 9 and the scanning field 10 prior to illuminating one of the photosensors 13. In normal operation of the measuring system the signal generated by this photosensor is, however, not evaluated. In like manner, respective ones of the photosensors 13 generate respective signals each time one of the markings 15 is moved over the scanning field 16, or one of the markings 17 is moved over one of the reference marks $R_o \ldots R_n$ or one of the markings 18 is moved over one of the code marks $C_o \ldots C_n$. These signals similarly are not evaluated during normal operation of the measuring system. During normal operation of the measuring system only the signals that are generated by rotation of the shaft 2 and the graduated disc 3 with respect to the housing 1 are evaluated by means of light modulated by the incremental graduation 4 and the associated scanning fields 9. This modulated light is detected by associated ones of the photosensors 13.

In incremental measuring systems, it is of great importance to be able to determine a reference position at the commencement of a measuring operation that serves as a starting point for incremental measurements. In many applications it is critically important that this reference position be reproduceable in the event the measuring operation is interrupted or interfered with.

In the following discussion, it will be assumed that either before the commencement of a measuring operation or after an interruption in a measuring operation (in which as is well known the measuring value of an incremental measuring system will be lost) the objects to be measured are at a standstill relative to one another.

Given this situation, the graduated disc 3 is in a position in which the position of its graduation zero point relative to the housing 1, and therefore relative to the scanning plate 8, is not known.

In order to establish this reference position, the momentary position of the graduated disc 3 must be determined. For this purpose, a counter included in the evaluating system is set to zero or to a prescribed numerical constant in a manner that is well known to those skilled in the art and therefore not described here in detail. In addition, the measuring system is simultaneously switched to a calibrating mode of operation. The carrier body 5 is then rotated by the motor M as already described. This is possible since rotation of the carrier body 5 is independent of movement of the graduated disc 3 and the housing 1. One of the markings 15 on the rotating carrier body 5 sweeps over the scanning field 16 on the scanning plate 8 within a short time. When this happens, a signal is generated by a corresponding one of the photosensors 13 which starts the counter (not shown) included in the evaluating system in the calibration mode of counting. From this instant on, signals generated in response to the graduation 6 and the scanning fields 10 are evaluated as counting impulses and counted. Thus, graduation increments that are scanned in the rotation of the carrier body 5 with respect to the scanning plate 8 are counted. At some time after the counter is started, the marking 17 comes into alignment over the next reference mark $R_i$ and the marking 18 reads off the associated code mark $C_i$. At the instant the reference mark $R_i$ comes into alignment with the marking 17, the counter is stopped by a signal generated by the associated photosensor. At this point the counter contains a measuring value indicative of the angle of rotation that the carrier body 5 has covered between the instant the counter was started and the instant the counter was stopped. The marking 18 has in the process read off the absolute position value from the code mark $C_i$ that is associated with the reference mark $R_i$ that has caused the stopping of the counter. This absolute position value is now stored in the evaluating system and is added to the measuring value of the counter. At this point, the evaluating system has determined the absolute position value that the graduated disc 3 momentarily occupies with respect to the housing 1. At this point, the calibrating process is complete. The counter can now again be used to count counting impulses generated in rotation of the graduated disc 3 by means of the graduation 4 and the scanning fields 9. The above-described calibrating process can be repeated as further measurement interruptions or interferences occur, even if the graduated disc 3 cannot be moved out of its momentary position, because for example a tool happens just at that time to be in engagement when the measurement is interrupted.

As described above, on coincidence of the marking 15 with the scanning field 16 the counter is started, and increments that are covered by the incremental graduation 6 over the scanning field 10 are counted until the counter is stopped on coincidence of the marking 17 with the next reference mark $R_i$ encountered after the counter has been started. At this time the marking 18 simultaneously scans the code mark $C_i$ and the absolute position value of the reference mark $R_i$ is superimposed in the evaluating system on the counted measuring value.

In this way the absolute position value which represents the momentary position of the graduation zero point of the graduated disc 3 with respect to the housing 1 is determined.

In the foregoing description of the calibrating process, it was assumed that shaft 2 and the graduated disc 3 are at a standstill with respect to the housing 1. This, however, is not a prerequisite. It must be assumed, of course, that the carrier body 5 turns at a faster rate than the graduated disc 3 during the calibration operation. The calibration is completed at the moment when the marking 17 overruns the reference mark $R_i$.

It is particularly advantageous if the markings 15,16,17 and the reference marks $R_o \ldots R_n$ are each composed of a sequence of irregularly distributed marking lines so that a sequence of marking lines forms in each case the respective marking.

Of course, it should be understood that a wide range of changes and modifications can be made to the preferred embodiments described above. For example, it should be apparent that the present invention is not limited to use with angle measuring systems, nor to use with optoelectronic scanning units. It is therefore intended that the foregoing detailed description be regarded as illustrative rather than limiting, and that it be understood that it is the following claims, including all equivalents, which are intended to define the scope of this invention.

I claim:

1. In an incremental measuring system of the type which comprises a measuring scale which defines a first plurality of scannable markings including an incremental graduation and at least one reference mark, the position of which is absolutely fixed with respect to a zero point of the graduation; a scanning unit which comprises a plurality of scanning fields for scanning selected ones of the first plurality of scannable markings along a scanning direction and means for generating scanning signals in response thereto, said scanning signals including periodic measuring signals generated in response to the incremental graduation; and an evaluating system for evaluating the scanning signals, said evaluating system comprising means for counting pulses derived from the measuring signals as a measure of relative movement between the scanning unit and the measuring scale; the improvement comprising:

a carrier body which defines a second plurality of scannable markings;

means for mounting the carrier body for movement relative both to the measuring scale and the scanning unit such that the second plurality of scannable markings can be brought into alignment along the scanning direction with at least a portion of the first plurality of scannable markings and scanning fields; and means for controlling the operation of the evaluating system upon alignment along the scanning direction of selected ones of the second plurality of scannable markings and selected ones of the scanning fields and first plurality of scannable markings.

2. The invention of claim 1 wherein the measuring scale is mounted for rotation with respect to a frame; wherein the first plurality of scannable markings comprises at least one code mark, each physically associated with a respective reference mark; wherein the mounting means mounts the carrier body for rotation with respect to both the frame and the measuring scale, concentrically with the measuring scale; wherein the second plurality of scannable markings comprises a carrier body incremental graduation, a first mark, a second mark, and a code mark scanning field; wherein the evaluating system comprises a counter; and wherein the scanning unit and evaluating system comprise means for controlling the counter to begin counting cycles of the carrier body incremental graduation in response to the first mark and means for stopping the counter in response to the second mark.

3. The invention of claim 1 wherein the at least one reference mark of the measuring scale comprises $2^n$ reference marks arranged in an arcuate track centered on an axis of rotation and wherein the measuring scale additionally defines $2^n$ code marks arranged concentrically with the reference marks, each of said code marks physically associated with a respective one of the reference marks and encoding an absolute position value indicative of the absolute position of the respective reference mark with respect to the zero point.

4. The invention of claim 1 wherein each reference mark comprises a sequence of component marks, and wherein the separation between adjacent ones of the component marks in each sequence varies irregularly.

5. The invention of claim 2 wherein each reference mark, the first mark and the second mark each comprise a respective sequence of component marks, wherein the separation between the adjacent ones of the component marks in each sequence varies irregularly.

6. The invention of claim 2 wherein the invention further comprises:
a motor; and
a linkage between the motor and the carrier body to allow the carrier body to be rotated by the motor.

7. The invention of claim 6 wherein the linkage comprises a toothed belt.

8. The invention of claim 1 wherein the second plurality of scannable markings comprises a second incremental graduation, wherein the scanning unit comprises means for generating a second set of periodic measuring signals in response to the second incremental graduation, and wherein the controlling means comprises means for counting pulses derived from the second set of periodic measuring signals.

9. An incremental measuring system comprising:
a measuring scale comprising a first incremental grid and a set of reference marks;
a carrier body mounted for movement with respect to both a frame and the measuring scale, said carrier body comprising a second incremental grid and at least first and second control marks;

a scanning unit mounted for movement with respect to the measuring scale and the carrier body to scan the measuring scale and the carrier body, said scanning unit comprising means for generating first and second sets of measuring signals in response to the first and second incremental grids, respectively, and means for generating control signals in response to the control marks;

means for evaluating the measuring signals and the control signals, said evaluating means comprising means, responsive to the first measuring signal, for counting first pulses derived from the first measuring signal to measure relative movement between the measuring scale and the scanning unit during a measuring mode of operation, and means, responsive to the second measuring signal and the control signals, for counting second pulses derived from the second measuring signal to measure the absolute position of the measuring scale with respect to the frame during a calibrating mode of operation.

10. The invention of claim 9 wherein the scanning unit is fixedly mounted to a frame, wherein the measuring scale is mounted on a shaft which is mounted to rotate with respect to the frame about a rotation axis, and wherein the carrier body is mounted for rotation with respect to both the frame and the measuring scale about the rotation axis.

11. The invention of claim 10 wherein the first and second incremental grids are arranged as respective first and second arcuate tracks centered on the rotation axis.

12. The invention of claim 11 wherein the set of reference marks comprises $2^n$ reference marks arranged in a third arcuate track centered on the rotation axis, and wherein the measuring scale additionally defines $2^n$ code marks arranged concentrically with the reference marks, each of the code marks radially aligned with a respective one of the reference marks and encoding an absolute position value indicative of the absolute position of the respective reference mark with respect to the zero point.

13. The invention of claim 10 further comprising:
a motor mounted to the frame; and
a linkage between the motor and the carrier body to allow the carrier body to be rotated by the motor.

* * * * *